Sept. 18, 1956         R. J. FIEDLER            2,763,820
                  BATTERY CHARGER CONTROL
                     Filed July 13, 1953
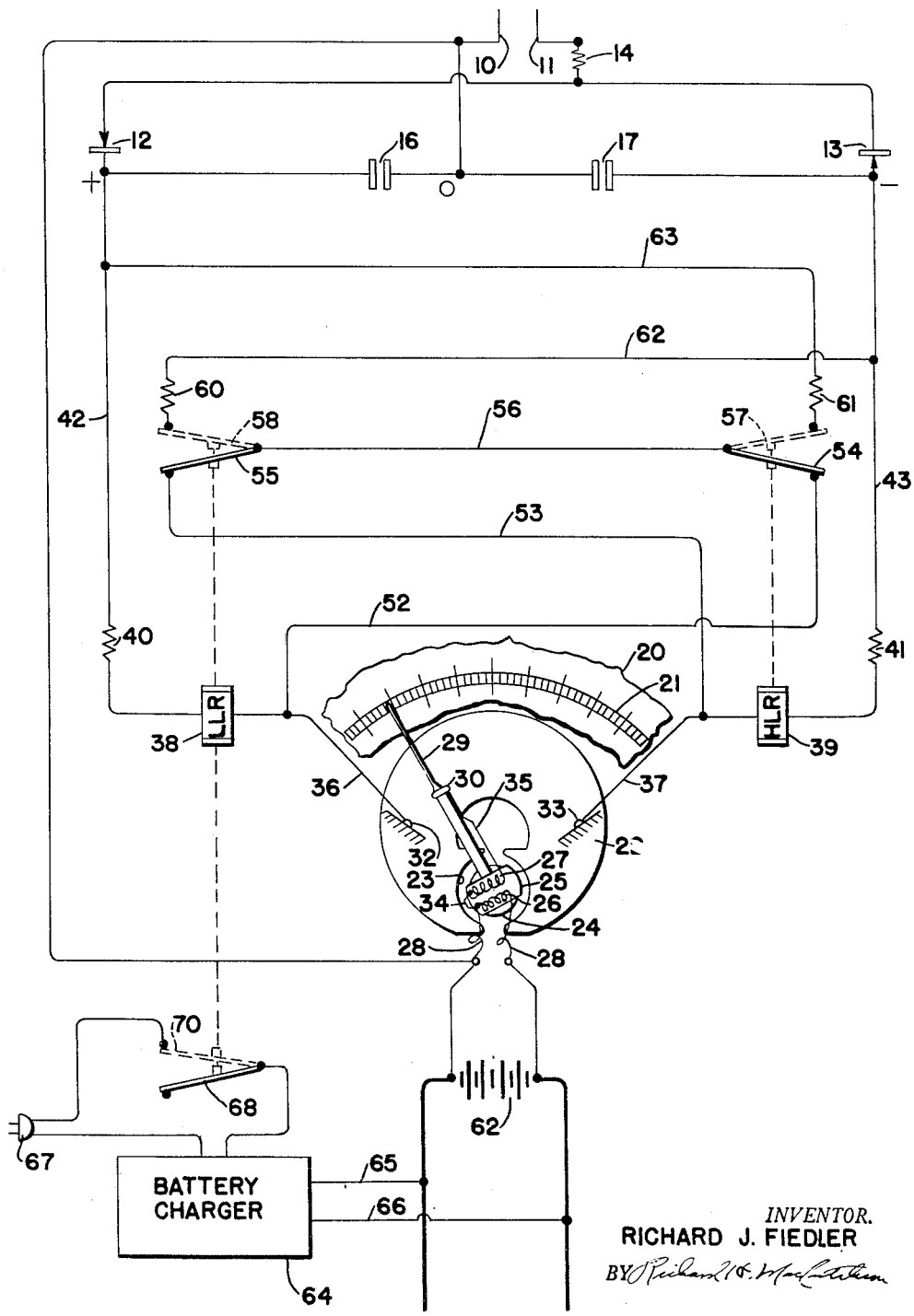
INVENTOR.
RICHARD J. FIEDLER
ATTORNEY

United States Patent Office 2,763,820
Patented Sept. 18, 1956

2,763,820

BATTERY CHARGER CONTROL

Richard J. Fiedler, Cleveland Heights, Ohio, assignor to Assembly Products, Inc., Chagrin Falls, Ohio, a corporation of Ohio Application July 13, 1953, Serial No. 367,507

3 Claims. (Cl. 317—152)

This invention relates to improvements in electrical control and has particular significance in connection with systems for controlling the charge of a storage battery and in which it is desired to cut off the charging current when a certain battery voltage has been reached, but to reconnect the battery to the charging source if it should subsequently be subjected to a material discharge, and the invention particularly relates to improved means for charging the small new storage batteries which have a critical charge voltage and which are ruined if overcharged a slight amount.

Heretofore, small storage batteries having such a critical charge voltage have been used extensively but no satisfactory battery charging control for them has been developed up to now. In any battery charging control system it is necessary to employ some potential responsive means that will function to control contact elements in response to a comparatively narrow range of potential values. As is well known to the art, this fact rules out the use of solenoid or clapper type of relay because the value of its pick-up ampere turns is so much higher than its drop out ampere turns. Many potential responsive relays, as they have been constructed heretofore, are contact making volt meters which have the advantage of little difference between pick up and drop out but the disadvantage that they do not develop sufficient torque to make sufficiently reliable and positive contact for control purposes. While it has been known to use a contact making galvanometer type of instrument having a booster coil for the purpose of increasing the pressure between the contacts and locking them together when they first meet, as described and claimed in Patent 2,576,371, issued November 27, 1951, upon an application filed by Bradley R. Thompson and George E. Hammond, such an arrangement for a battery charging application has up to now had certain disadvantages because proper and inexpensive circuitry has never been provided. That is, it has not been known how to open the "boosted" or locked contacts without resorting to a multiplicity of complicated relays. Thus, while the use of contact making galvanometers for battery charging control has been known to the art, and while the use of a swinging coil type of contact meter with contact locking has also been known, still the prior art control arrangements used with such meters have not provided for efficient locking current reversal to take care of the opposite requirements for the two limits of travel involved together with efficient locking current reversal for each direction of travel after the initial locking has performed its desired function.

It is an object of the present invention to provide simple and inexpensive means for overcoming the above mentioned difficulties.

A further object of the present invention is to provide a simplified and compact relay and control scheme which may be actuated by relatively small current flow increase or decrease.

Another object of the invention is to provide a two limit control system which shall provide easily adjustable start and stop and indicating features for application to extremely voltage sensitive equipment.

A still further object of the present invention is to provide control means whereby a sensitive pointer actuating measuring element is free to deflect in response to small changes in a measured magnitude, and directly to actuate engaging contact members which upon engagement initiate such influences as will tend to amplify the force of engagement until the desired action of operating a relay or the like is effected whereupon the auxiliary force is not only removed but reversed and the measuring element left free to assume a position representative of the measured magnitude.

Broadly speaking, in accordance with the illustrated embodiment of the invention I provide a rotating coil meter with high limit and low limit contacts and with more or less conventional contact locking means together with inherent potential reversal (independent of relay action) of locking coil current and torque for high limit with respect to low limit so that the initial lockng torque will be in the same direction as sensitive coil torque which caused it, and also together with three wire reverse potential means, and low and high limit relays, and interconnections from the three wire reverse potential means through the meter locking coil, the respective meter contacts, and the respective relays so that for limit of travel in either direction a relay will pick up to further reverse locking torque after meter contact closing so that there will be a very quick breakaway.

Other objects and advantages will become apparent and the invention will be better understood from consideration of the following description taken in connection with the accompanying drawing, the single figure of which diagrammatically shows a battery charging control scheme constructed in accordance with the invention.

Referring to the drawing, lines 10 and 11 are assumed to be from an A. C. source of power, such as the secondary of an isolating supply transformer (not shown). These lines feed a more or less conventional voltage doubler circuit comprising oppositely directed rectifiers 12 and 13 fed from line 11 through a condenser charging current limiting resistor 14 and with condensers 16, 17 connecting the opposite sides of the respective rectifiers back to line 10. Condensers 16, 17 serve to fill out the wave form, and with this arrangement, as is known to the art, the voltage across the capacitors, from the point marked "+" to the point marked "—" is substantially twice that of the voltage across lines 10 and 11, the voltage of which is about the same as the voltage from the mid point marked O to "+" or to "—." There is thus provided a three wire source of reverse polarity voltage. However, I do not mean to limit the invention to the use of such a voltage doubling circuit fed from an A. C. source in order to provide a three wire source of reverse polarity voltage for obviously the result could be accomplished in other ways as by employing a center-tap resistance fed by a battery.

The control includes a galvanometer type contact meter having a meter face plate 20 provided with a graduated scale 21, and more or less in back of which is located a permanent magnet field producing piece 22 having an annular opening 23 in which is located a stationary core 24. Rotatable about the core 24 and between it and the magnet 22 is a movable coil assembly 25 provided with a sensitive coil 26, which as hereafter explained is arranged responsive to initial signal, and a second coil 27 which provides an additional or locking torque. As is conventional for such type meters, and as is described in the above mentioned Thompson and Hammond patent, the coil assembly is mounted on steel pivots turning in jewelled bearings responsive to interaction of coil current and permanent magnet field with this action restrained by hair springs shown only symbolically at 28. These springs serve also to carry current to and from the movable coil assembly.

A pointer 29 is mounted for movement with the coil assembly 25 and carries a contact 30. Contact 30 is designed to mate at predetermined limits of travel in respectively opposite directions with a low limit contact 32 and a high limit contact 33. Although limit contacts 32 and 33 are shown as stationary, mounted for example on the base or case of the instrument, it will of course be understood that they can be set at any predetermined position and might be carried upon manually adjustable high limit and low limit pointers (not shown).

In operation, as hereinafter more fully described, a voltage is supplied to the locking coil 27 in series with the limit locking contacts for the purpose of increasing the pressure between contacts. Thus, for example, upon the mating of contacts 30 and 32 a circuit will be closed to provide current in coil 27 in such a sense as to provide a counterclockwise torque to increase the contact closure force, and upon closure of contacts 30 and 33 a current will flow through coil 27 in the opposite direction to provide torque in a clockwise direction still to provide an additional closing torque on the contacts. To this end, locking coil 27 is connected by a jumper 34 through one of the springs 28 back to what might be called the zero line 10. The other end of the locking coil is connected through a jumper 35 to movable locking contact 30. Relatively stationary locking contact 32 is connected through a line 36 in series with coil 38 of a low limit relay (LLR), and a resistor 40, and line 42 to the plus output of rectifier 12. High limit contact 33 is connected to a line 37 through an HLR relay coil 39, and resistor 41, to a line 43, connected to the minus side of rectifier 13.

In accordance with the present invention the relays control continued energization of themselves and re-energization of the locking coil through additional parallel circuits provided as follows:

From contact 32, through line 36, through a branch circuit line 52, through normally closed contact 54 of relay HLR, through a line 56, through an LLR picked up closed contact 58 which as soon as this relay picks up through energization of its coil 38 assumes the dotted position shown and connects through a protective resistor 60, and through a line 62, to minus line 43.

When the meter device subsequently has its pointer swing over to the opposite extreme, the high limit, a circuit may be traced from zero line 10, spring 28, jumper 34, locking coil 27, jumper 35, locking contact 30, locking contact 33, line 37 to a branch circuit 53. As will hereafter be more fully described in connection with a description of operation of the entire circuit, branch line 53 will, at a certain time after closure of the meter contacts at high limit, be connected through the LLR control contact as shown in its dropped out position in solid lines at 55, to line 56, and thence through HLR picked up closed contact 57 (shown dotted), through a resistor 61 and line 63 to plus line 42.

The contact device, which may be a meter instrument as shown and described, or which may be simply a rotatable coil relay with no indicating function, has its sensitive coil 26 connected across a battery 62 which is to be charged in accordance with one object of the whole system. A more or less conventional battery charger 64 has its output lines 65, 66 connected across the battery output. The battery charger input is derived from a source of power schematically shown as a plug 67 connected in series with LLR contact 68, 70 in such manner that the battery charger input circuit will be completed when LLR is picked up.

For an understanding of the operation of the arrangement, let it first be assumed that pointer 29 has previously swung to the low limit to energize LLR so that contacts 53 and 70 are in the dotted position shown. As will hereinafter become apparent, the contacts will remain in this position until the other limit of travel is reached by the pointer. As soon as the high limit is reached contacts 30—33 close completing a circuit which may be traced from line 10, through spring 28, jumper 34, locking coil 27, jumper 35, contact 30, contact 33, line 37, coil 39 of HLR, resistance 41, lead 43 to minus, through rectifier 13, and resistance 14, back to A. C. line 11. This establishes a unidirectional flow of current through locking coil 27 and the apparatus is so designed and arranged that this flow tends to lock the contacts more tightly together. At this instant (immediately after locking contacts 30—33 have mated) contact 33 is, compared to line 10, at "minus" potential because LLR contact 55, 58 is still picked up so that there is no circuit through line 53. The arrangement is such that the duration of the additional torque thus produced is only long enough to insure with certainty that a control impulse is given but the same current which causes this impulse as it flows through coil 27 also flows through the HLR coil 39. HLR picks up and this, first of all, breaks the holding circuit for LLR relay coil 38, causing LLR to drop out, and, secondly, establishes a circuit from line 37, through connection 53, LLR contact 55, connection 56, HLR contact 57, resistor 61, and connection 63 back to line 42, and "plus" at rectifier 12. The resistance values are selected (e. g., if the relay coils are each 6000 ohms, 40 and 41 may each be 5,000 ohms, and 60 and 61 may each be 10,000 ohms) so that the drop across resistance 61 is not as great as the drop across the combined effective resistance of coil 39 and resistance 41, thus the effective polarity of line 37 is reversed, as is the polarity on contact 33, causing a reversal of current through locking coil 27 in such a sense as to oppose the locking effect and cause contacts 30 and 33 to break apart. While the action described has reversed the polarity of line 37 so far as the locking coil is concerned (37 now being more positive than the zero line 10); so far as relay HLR coil 39 is concerned, the effective polarity of line 37 is the same and the voltage is even doubled so that the relay very effectively seals in.

After the conditions just described have occurred, that is after high limit has been reached and the contacts have been forced apart, the needle will freely swing in the intermediate portion of the scale, between high and low limit with LLR relay dropped out, so that the charger 64 remains "off" until the low limit is reached as by discharge of battery 62 supplying some load (not shown). When low limit is reached, it has a double action which in both of its parts is just the reverse of that at high limit that is, first the circuit is from line 10, spring 28, jumper 34, coil 27, jumper 35, contact 30, contact 32, line 36, coil 38, resistance 40, line 42 to plus in such a sense as to turn the pointer more strongly counterclockwise, and very soon thereafter LLR picks up, HLR drops out and there is a very strong tendency for the pointer to swing clockwise and resume an intermediate position with the battery charger at this time operating to charge the battery. The charger then continues to operate until the high limit of travel is reached. Thus, for either direction of needle travel, the aiding force is switched into operation in a sense that it will aid in the closing of the contacts, it is reversed as soon as this operation is completed to aid in the opening of the contacts, and then switched out so that closing of locking contacts at high or low limit causes the locking coil action first to close tight and then to cause the contacts to jump apart establishing a very desirable condition where, quite unlike the action in the case of the usual solenoid relay, the relay is just as sensitive soon after closing as it was before closing, and still, as is not the case for most contact making meters, the contact sealing torques are much greater than the forces which initiated them.

With the arrangement described, that is with a two limit control system including apparatus to be controlled and a galvanometer type of instrument having a sensitive coil and a contact locking coil with the coils movable together and the locking coil connected in series with limit of travel contacts so that when the contacts close current flows through the locking coil producing additional turning torque to build up contact pressure, and with a load relay with contacts for energizing and de-energizing the apparatus, and with relay coils and contacts connected to the limit contacts in such a manner as to reverse the polarity thereupon after closure, very effective, inexpensive and efficient means are provided for meeting the objects above set forth.

The invention is not to be limited to a case where absolutely stationary limits are employed, for as already intimated other arrangements, such as contact carrying pointers mounted coaxially with the indicating pointer, could be employed instead. Further it is not essential that the arrangement be limited solely to battery charging control for it may have utility in other arrangements where an operation starts and stops at certain limits such as to control level or pressure in a tank, to control the load on a conveyor, or to control carbon feed in an arc furnace.

While I have illustrated and described a particular embodiment, various modifications may obviously be made without departing from the true spirit and scope of the invention which I intend to define in the appended claims.

I claim:

1. In combination, a contact making instrument having a variable position part carrying a sensitive coil and additionally carrying series connected locking coil and limit contact making means, a pair of relatively stationary limit contacts each arranged to cooperate with said means for a different limit of travel, means including a pair of relays for reversing the polarity on the contacts and the current through the locking coil for either limit of travel, and means including a three wire source of potential connected through said relays for initially energizing said locking coil in a contact closing sense and thereafter effecting said reversal of polarity and current.

2. In an electric control system for controlling the charge of a storage battery or the like, a galvanometer type of instrument having a sensitive coil arranged to be rotated responsive to the voltage of the battery to be charged, a movable contact making pointer having a contact and arranged to be rotated responsive to movement of said coil, low and high limit of travel relatively stationary contacts arranged to cooperate with said movable pointer contact to complete a different circuit for either limit of travel, a locking coil rotatable with the sensitive coil and connected to he pointer contact, low and high limit relays having their coils connected in circuit with said low and high limit relatively stationary contacts, a three wire source of voltages of reverse polarity with the center wire connected to said locking coil and the other wires respectively connected to the sides of the relay coils oposite the associated stationary contacts, and connections from said three wire source through contacts of said relays to said relatively stationary contacts, whereby means are provided for switching a contact closing aiding force into operation for either limit of pointer travel and for soon thereafter reversing said force to afford quick breakaway so that the instrument will then operate responsive to relatively small current flow increase or decrease in said sensitive coil.

3. In an electric control system for controlling the charge of a storage battery, and including a battery to be charged, battery charger equipment including a first source of power and connections for establishing and breaking a circuit from said source through charger to battery, the combination of: a galvanometer type instrument having a movable sensitive coil arranged to move between two limits of travel responsive to the voltage of the battery to be charged, and having a movable contact-making pointer having a contact and arranged to be moved responsive to movement of said sensitive coil, low and high limit of travel relatively stationary contacts arranged to cooperate with said movable pointer contact to complete a different circuit for either limit of travel, a locking coil movable with the sensitive coil and connected in series circuit with the movable pointer contact, low and high limit relays having their coils connected respectively in series circuit with said low and high limit relatively stationary contacts, a three-wire source of voltages of reverse polarity with the center wire thereof connected to said locking coil to complete a circuit therethrough and to said pointer contact and with the other wires of said three-wire source respectively connected to the low and high limit relay coils and therethrough to the respective stationary contacts, the low limit relay having a normally open power circuit contact connected in the circuit of the connections for making and breaking a circuit from the first source to the charger, normally open and normally closed control circuit contacts additionally associated with the low limit relay, normally open and normally closed control circuti contacts associated with the high limit relay, means including cross-connections for establishing a circuit from the low limit relatively stationary contact through the normally closed control circuit contact of the high limit relay and therefrom through the normally open control circuit contact of the low limit relay and therethrough to the side of the three-wire source opposite the side connected through the low limit relay coil to the low limit relatively stationary contact, and cross connections from the high limit relatively stationary contact through the normally closed control circuit contact of the low limit relay and therefrom through the normally open control circuit contact of the high limit relay and therethrough to the side of three-wire source opposite the side connected through the high limit relay coil to the high limit relatively stationary contact, and proportioning resistances in circuit with various portions of the circuit such that any voltage drop across the respective relay coils and associate resistors is greater than the drop through the cross connections above described so that the polarity of the lines leading from the relatively stationary contacts will be effectively reversed to cause a reversal of current through the locking coil in such a sense as to oppose locking effect for either limit of travel soon after the locking contacts engage for that limit of travel, whereby there is provided locking for either direction of travel independent of relay action and also reversal of locking torque to cause breakaway at any limit of travel, all in a simple and compact apparatus.

References Cited in the file of this patent

UNITED STATES PATENTS

| | | |
|---|---|---|
| 2,189,846 | Valtat | Feb. 13, 1940 |
| 2,259,343 | Harris | Oct. 14, 1941 |
| 2,272,914 | Keeler | Feb. 10, 1942 |
| 2,558,670 | Breen | June 26, 1951 |

FOREIGN PATENTS

| | | |
|---|---|---|
| 643,434 | Great Britain | Sept. 20, 1950 |